W. L. SCHELLENBACH.
BELT SHIFTING MECHANISM.
APPLICATION FILED OCT. 25, 1918.
1,310,214.
Patented July 15, 1919.
2 SHEETS—SHEET 1.
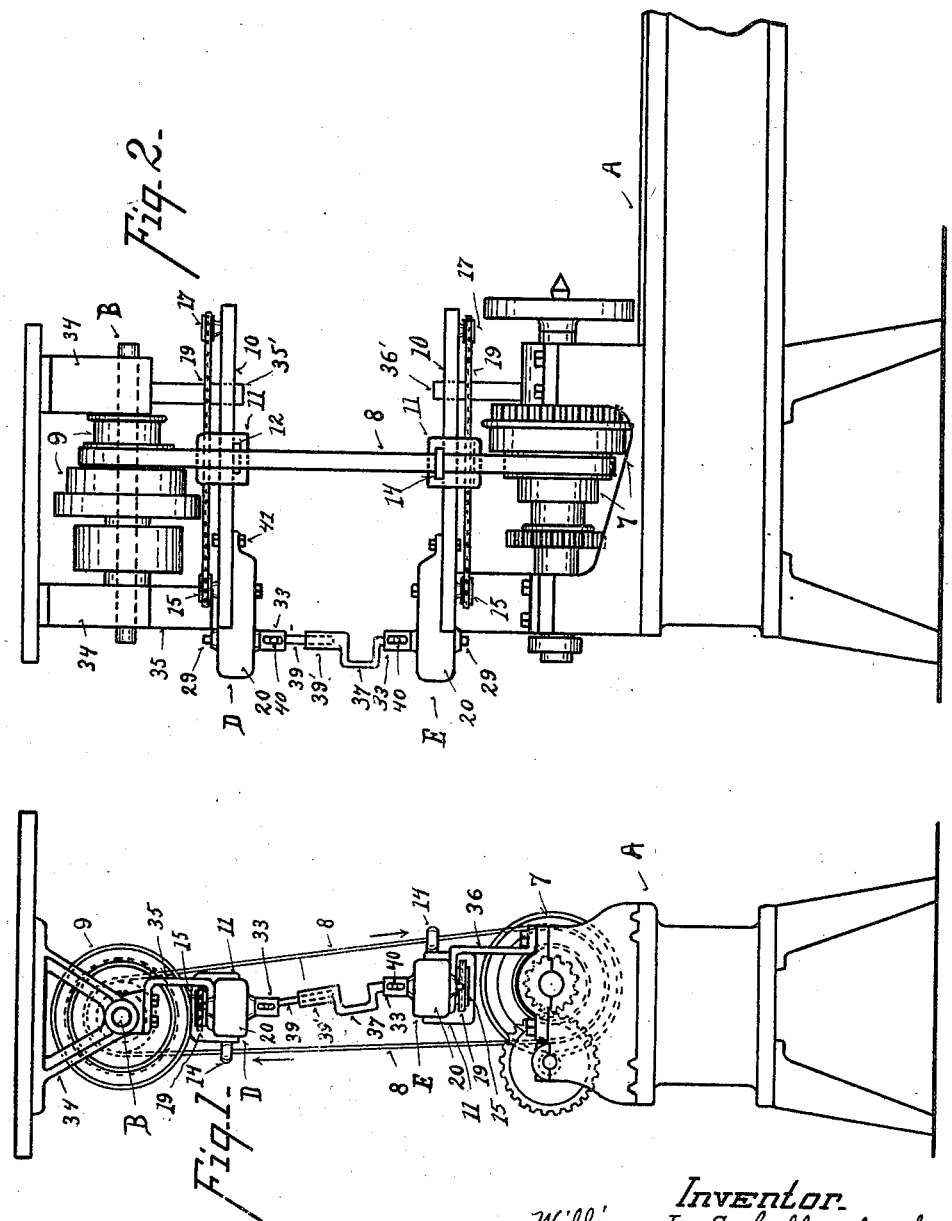
Inventor
William L. Schellenbach,
By C. W. Miles,
Attorney

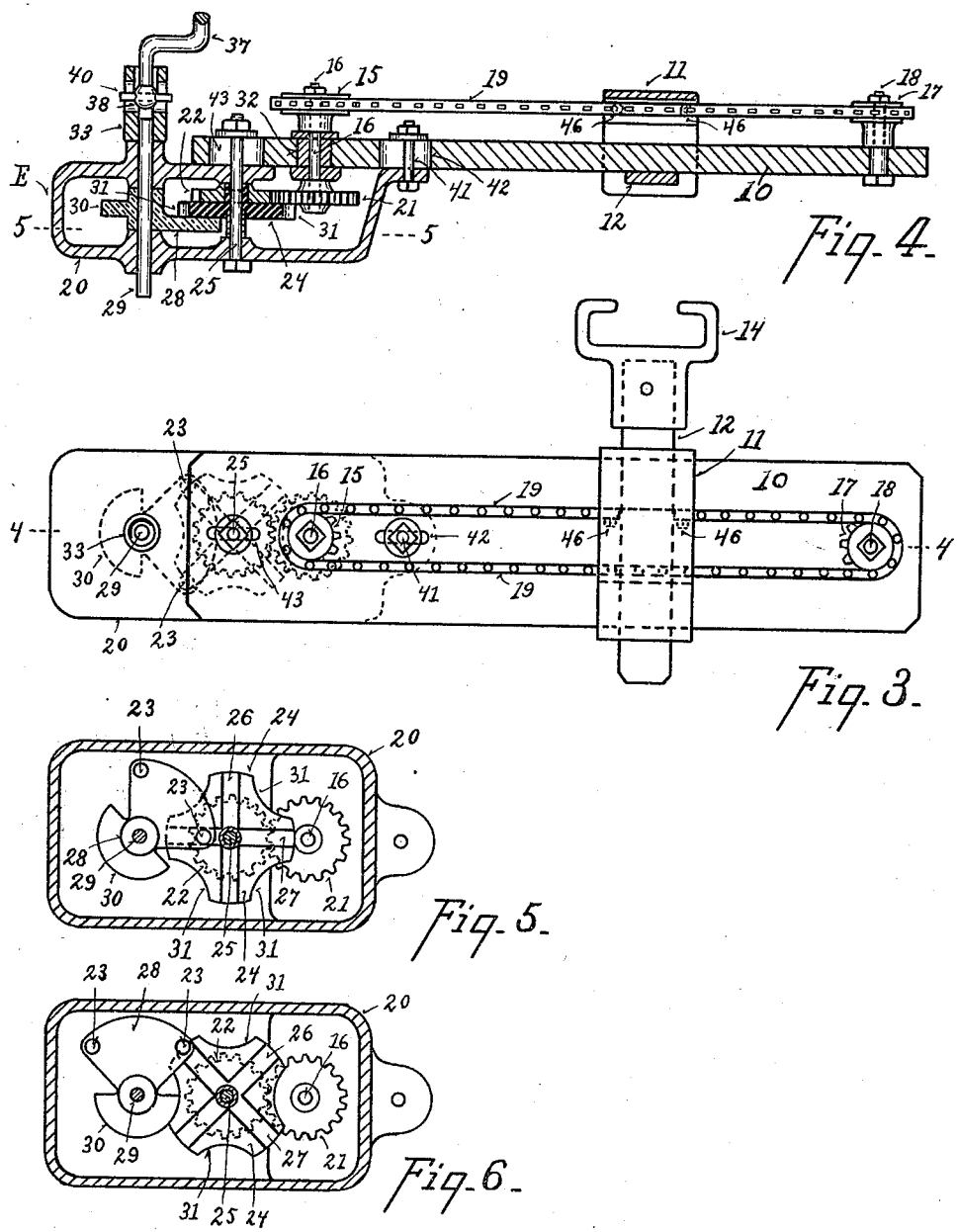

UNITED STATES PATENT OFFICE.

WILLIAM L. SCHELLENBACH, OF WYOMING, OHIO.

BELT-SHIFTING MECHANISM.

1,310,214. Specification of Letters Patent. Patented July 15, 1919.

Application filed October 25, 1918. Serial No. 259,697.

*To all whom it may concern:*

Be it known that I, WILLIAM L. SCHELLENBACH, a citizen of the United States, residing at Wyoming, in the county of Hamilton and State of Ohio, have invented certain new and useful Improvements in Belt-Shifting Mechanism, of which the following is a specification.

My invention relates to improvements in belt shifting mechanism. One of its objects is to provide improved belt shifting mechanism to shift a belt at one operation upon a driving and driven cone pulley. Another object is to provide improved, simple, and reliable belt shifting means. Another object is to provide cone pulley belt shifting means readily operable in either direction to increase or decrease the speed of the driven cone pulley. Another object is to provide improved stock belt shifting mechanism conveniently and readily adaptable to belts and pulley faces of different widths, and other variable conditions of operation. My invention also comprises certain details of form, combination and arrangement, all of which will be fully set forth in the description of the accompanying drawings, in which:

Figure 1 is an end view of a lathe and countershaft with my improved belt shifting mechanism applied thereto.

Fig. 2 is a front elevation of the same.

Fig. 3 is a plan view of one of the belt shifting elements detached.

Fig. 4 is a central vertical section on line 4 4 of Fig. 3.

Fig. 5 is a sectional detail on line 5 5 of Fig. 4 showing one position of the intermittent gear mechanism.

Fig. 6 is a view similar to Fig. 5 showing another position of the intermittent gear mechanism.

The accompanying drawings illustrate the preferred embodiment of my invention in which A represents a lathe or other machine to be driven provided with a cone pulley 7 by means of which it may be driven at relatively different rates of speed by means of a belt 8 from a countershaft B which is provided with a driving cone pulley 9 the counterpart of the driven cone pulley 7. The general practice heretofore has been to shift the belt by hand first on one cone pulley and then on the other, which consumed considerable time and was an inconvenient and more or less dangerous operation.

In order to shift the belt at the same time on the driving and driven cone pulleys with reliability and certainty and without stopping the countershaft or driven machine I provide a belt shifting element to shift the belt relative to the driving cone pulley and a belt shifting element to shift the belt relative to the driven cone pulley, said belt shifting elements being connected to and operated in unison through a hand operated shaft common to both.

The respective belt shifting elements D and E are duplicates one of the other and each comprises a stationary guide 10 of the requisite length along which travels a carriage 11 to which is attached the shank 12 of a belt shifter finger 14. A driving sprocket wheel 15 is mounted upon a shaft 16 at one end of the guide 10, and an idler sprocket wheel 17 is mounted near the opposite end of the guide 10 upon a stud shaft 18. A sprocket chain 19 has its opposite ends attached at 46 to the carriage 11 and is trained over the sprocket wheels 15 and 17 so that when the driving sprocket wheel is rotated the carriage and belt shifter will travel along the guide 10.

The sprocket wheel 15 is mounted rigidly upon the shaft 16 and said shaft is journaled in a sleeve 32 carried by the guide 10, and at its opposite end is provided with a spur gear 21 which meshes with and is driven by a spur gear 22. The gear 22 is keyed to a sleeve projected from the slotted plate or disk 24 forming part of an intermittent gear mechanism. The plate 24 is journaled upon a bolt 25 passing through the housing 20.

The plate 24 has cross-slots 26 and 27 cut in one face to be engaged by pins 23 mounted upon the intermittent driving member 28, which is rigidly mounted upon a shaft 29 journaled at opposite ends in the housing 20. The intermittent driving member also has a section of its periphery 30 in position to engage counterpart notches 31 cut in the periphery of the plate 24 to lock the plate 24 against rotation except when the member 28 is positively driven by the shaft 29, and thereby through engagement of the pins 23 with the cross-slots 26 and 27 to intermittently rotate the plate 24 and through its gear train to rotate the sprocket wheel 15.

The shaft 29 projects a short distance outside of the housing 20 at each end and is adapted to have a sleeve 33 pinned or keyed thereto at either end. Member D is preferably mounted rigidly relatively to the countershaft hanger 34 by means of a bracket 35, and the member E is rigidly mounted relative to the machine to be driven by means of a bracket 36. A crank shaft 37 having a ball 38 seated in the bore of the sleeve 33 of member E is connected by a telescopic joint of polygonal cross sectional pattern with a rod or shaft 39 having a head or ball similar to the ball 38 seated in the bore of sleeve 33 of member D. The heads 38 of shafts 37 and 39 are held in place relative to the respective sleeves 33 by means of pins 40 passing through slotted openings in the sleeves and through said heads, thereby providing substantially universal joint effects where the sleeves 33 and shafts 37 and 39 are connected, and enabling members D and E to be variously placed relative to each other and at the same time readily connected by members 37 and 39 and operated thereby in unison, due to such universal joint effect and to the extensible telescopic joint 39' between them.

It is desirable to have only a single or "stock" size of belt shifting apparatus and to make provision for its adaptation and use for shifting belts of the same or different widths upon pulleys of different widths of face. In order to make these adaptations the bolts 25 and 41 pass through longitudinal slots 42 and 43 in the guides 10, which guides may be of different lengths in pairs if desired. Then by changing the relative diameter of the gears 21 and 22, as by substituting a gear of different diameter for either or both of them, and thereafter adjusting the bolts 25 and 41 in the slots 42 and 43 until the gears 21 and 22 are in mesh, the relative amount of travel of the sprocket chain and carriage 11 relative to the guide 10 for each revolution of the plate 24 and gear 22 may be varied at will to provide for shifting belts upon cone pulleys having a width of face of say 2, 3, 4, and 5 inches, without other change than in the gear ratio between the shafts 25 and 16.

In practice the driving shaft and the respective intermittent gear mechanisms are connected up so that one carriage will move in advance of the other, that is so that when moving toward the right hand in Fig. 2 the upper end of the belt will first be thrown from one cone pulley to the other, and immediately thereafter the lower carriage will move to feed the slackened belt up onto the next larger cone pulley thus again straining the belt. If desired the guides 10 may be supported at their right hand ends, see Fig. 2, by means of brackets 35' and 36'. Means other than sprocket chains may be employed if desired to transmit motion from the intermittent gear mechanisms to the belt shifter carriages.

The mechanism herein illustrated and described is capable of considerable modification without departing from the principle of my invention.

What I claim is.

1. Belt shifting apparatus comprising a stationary guide, a carriage provided with a belt shifter mounted upon and movable along said guide, a belt mounted upon a driving and a driven pulley carried by said guide to move said carriage along said guide, means to intermittently rotate said driving pulley to feed said carriage, and means to lock said belt and carriage at predetermined positions relative to said guide.

2. Belt shifting apparatus comprising a guide having a driving sprocket wheel and a driven sprocket wheel mounted thereon, a carriage provided with a belt shifter and movable along said guide, a sprocket chain mounted upon said driving and driven sprocket wheels and attached to said carriage to feed the carriage along said guide, means to rotate said driving sprocket wheel to feed said chain and carriage, and means to lock said carriage against movement at predetermined positions along said guide.

3. Belt shifting apparatus comprising a guide having a driving sprocket wheel and a driven wheel mounted thereon, a carriage provided with a belt shifter and movable along said guide, a sprocket chain mounted upon said driving and driven wheels and attached to said carriage to feed the carriage along said guide, and intermittent gear mechanism to drive said driving sprocket wheel and to lock said carriage at predetermined intervals against movement along said guide.

4. Belt shifting apparatus comprising a guide having a driving sprocket wheel and a driven wheel mounted thereon, a carriage provided with a belt shifter and movable along said guide, a sprocket chain mounted upon said driving and driven wheels and attached to said carriage to feed the carriage along said guide, intermittent gear mechanism to drive said driving sprocket wheel and to intermittently lock said driving sprocket wheel against rotation, and means to enable the speed ratio between said driving sprocket wheel and said intermittent gear mechanism to be changed.

5. Belt shifting mechanism comprising a guide having a driving sprocket wheel and a driven wheel mounted thereon, a carriage provided with a belt shifter and movable along said guide, a sprocket chain mounted upon said driving and driven wheels and attached to said carriage to feed the carriage along said guide, intermittent gear mechanism to drive said driving sprocket wheel and to intermittently lock said driving sprocket wheel against rotation, and a plurality of gears to provide for an interchange of gears interposed between said driving sprocket wheel and said intermittent gear mechanism to provide for different speed ratios between said intermittent gear mechanism and said driving sprocket.

6. In combination with a plurality of driving pulleys and a plurality of driven pulleys and a belt, a belt shifter comprising a plurality of guides each provided with a driving pulley and a driven pulley, a carriage provided with a belt shifter mounted upon and movable along said guide, a belt mounted upon said driving and driven pulleys of the guide and attached to said carriage to move the carriage along the guide, means to rotate the driving pulley of the guide, and means to lock said carriage at predetermined positions relative to said guide, and means to successively rotate the driving pulleys of the respective guides.

7. In combination with a plurality of driving pulleys and a plurality of driven pulleys and a connecting belt, a belt shifter comprising a plurality of guides each provided with a driving sprocket wheel and a driven wheel, a carriage provided with a belt shifter mounted upon and movable along said guide, a sprocket chain mounted upon said driving sprocket wheel and driven wheel and attached to said carriage to move said carriage along the guide, and intermittent gear mechanism to drive said respective driving sprocket wheels alternately.

8. Belt shifting mechanism comprising a guide, a movable carriage mounted upon said guide and provided with a belt shifting finger, intermittent gear mechanism to drive said carriage, and an interposed gear train between said carriage and intermittent gear mechanism, whereby a change in speed ratio between said intermittent gear mechanism and said movable carriage may be effected.

9. Belt shifting mechanism comprising a guide, a movable carriage mounted upon said guide and provided with a belt shifting finger, intermittent gear mechanism to drive said carriage, an interposed gear train between said carriage and intermittent gear mechanism, and means to provide for a change of speed ratio between said carriage and intermittent gear mechanism.

10. Belt shifting mechanism comprising guideways, carriers movably mounted on said guideways, belt shifter fingers carried by said carriers, a manually operated driving shaft intermediate of said guideways, intermittent gear elements between said driving shaft and said carriers, and a member interchangeable with similar members of different dimensions to provide for a greater or less movement to said carriers by a single revolution of said driving shaft.

11. Belt shifting mechanism comprising a plurality of guides, carriages movably mounted on said guides and provided with belt shifter fingers, a plurality of intermittent gear mechanisms to drive said carriages, a driving shaft interposed between said intermittent gear mechanisms, and a member interchangeable with similar members of different dimensions to provide for a greater or smaller movement to said carriages from a single revolution of said driving shaft.

12. Belt shifting apparatus comprising a hand operated driving shaft, a gear housing at each end of said shaft, a belt shifter guide carried by each of said gear housings, a belt shifting member movable along said respective guides, means carried by each guide to drive its belt shifting member relative thereto, an intermittent driving member in each of said housings driven by said driving shaft, and means within said respective housings driven from said intermittent driving members adapted to be interchangeably employed with similar elements to selectively drive said belt shifting members along said guides different distances for each revolution of said driving shaft.

13. Belt shifting apparatus comprising a pair of guides, belt shifting members movable along said respective guides, an intermittent power transmission member at one end of each of said guides, a shaft connected at opposite ends to said intermittent driving members, sprocket chains driven from said intermittent driving members to move said belt shifting members along said guides, and gear mechanism interposed between said intermittent driving members and the sprocket chains driven therefrom adapted to be interchanged with other gear members to attain different driving ratios between the intermittent driving members and the sprocket chains driven therefrom.

In testimony whereof I have affixed my signature.

WILLIAM L. SCHELLENBACH.

Copies of this patent may be obtained for five cents each, by addressing the "Commissioner of Patents, Washington, D. C."